S. S. VERNON.
COMPRESSED AIR POWER PLANT.
APPLICATION FILED MAY 5, 1917.
1,251,849.
Patented Jan. 1, 1918.
4 SHEETS—SHEET 3.
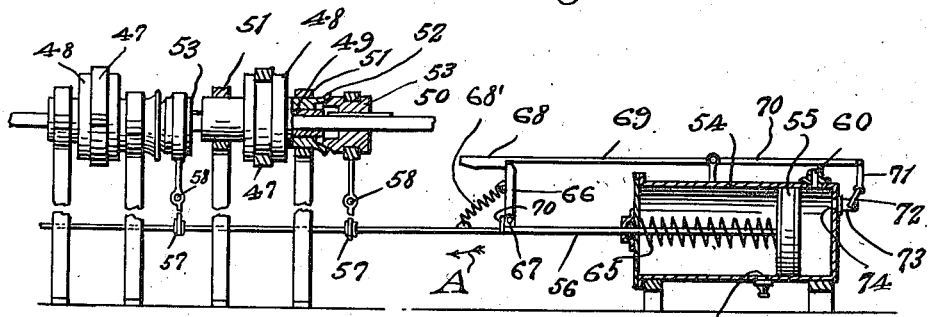
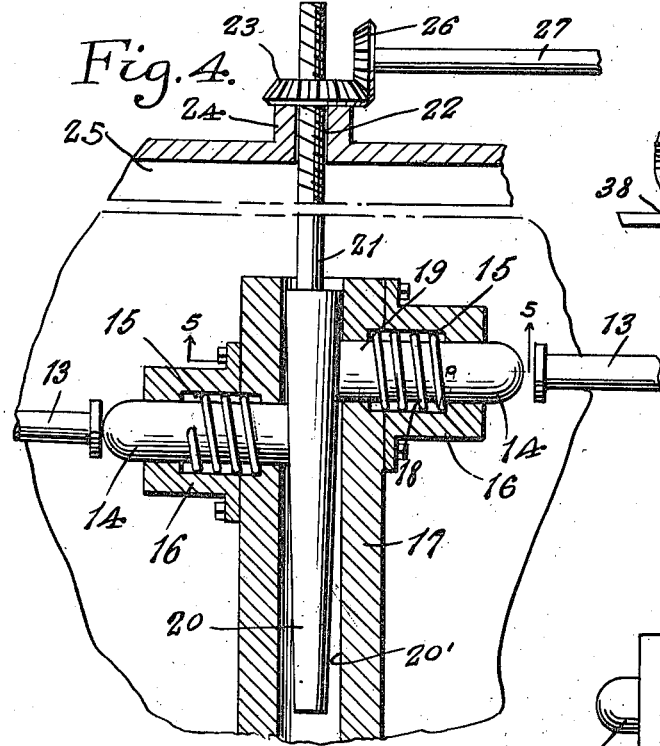
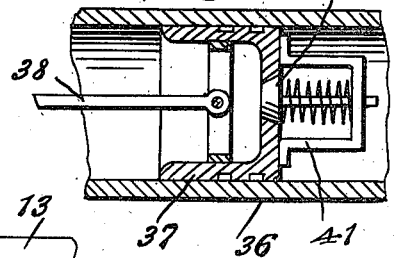
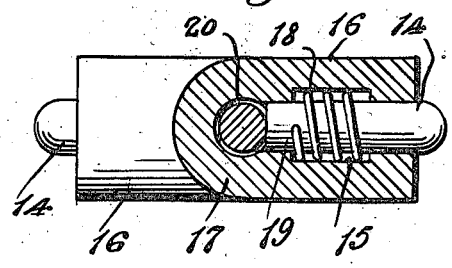
Inventor
S. S. Vernon.

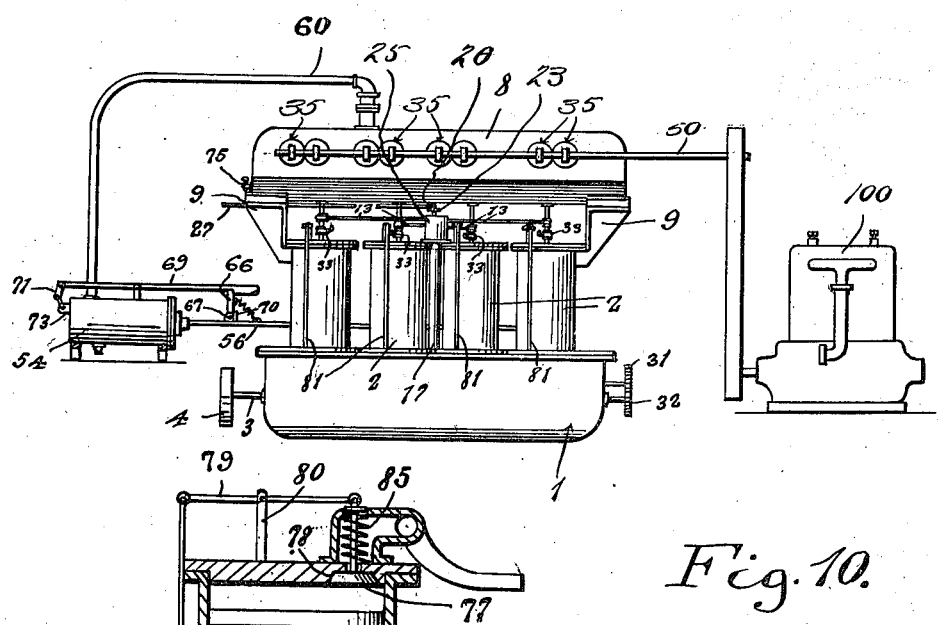

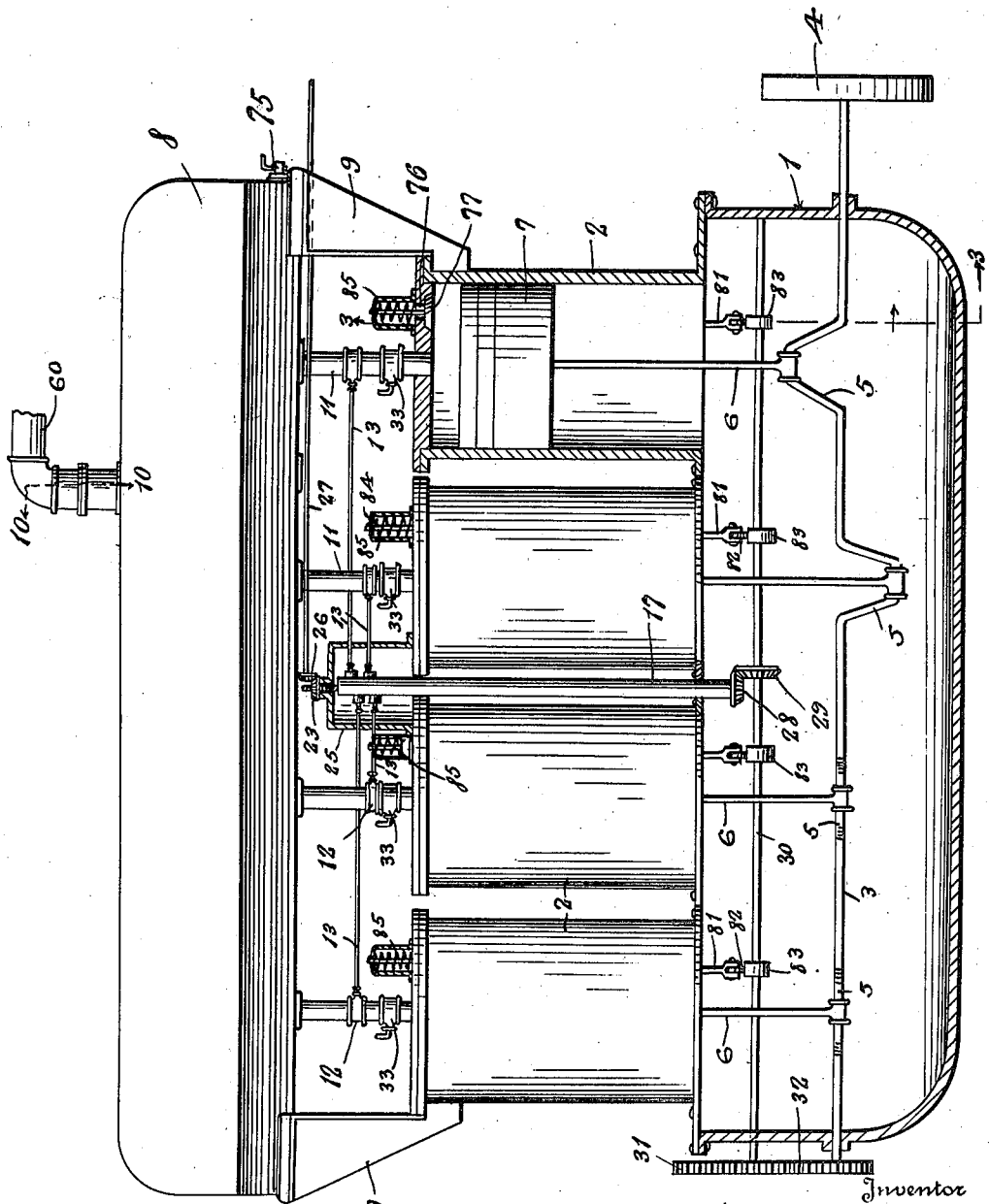

S. S. VERNON.
COMPRESSED AIR POWER PLANT.
APPLICATION FILED MAY 5, 1917.
1,251,849.
Patented Jan. 1, 1918.
4 SHEETS—SHEET 4.
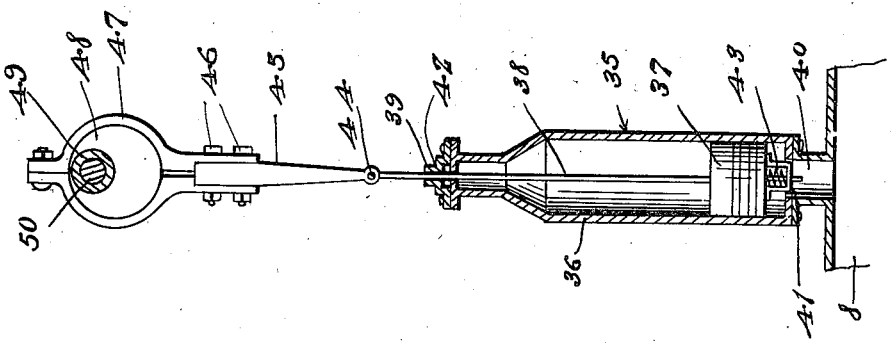
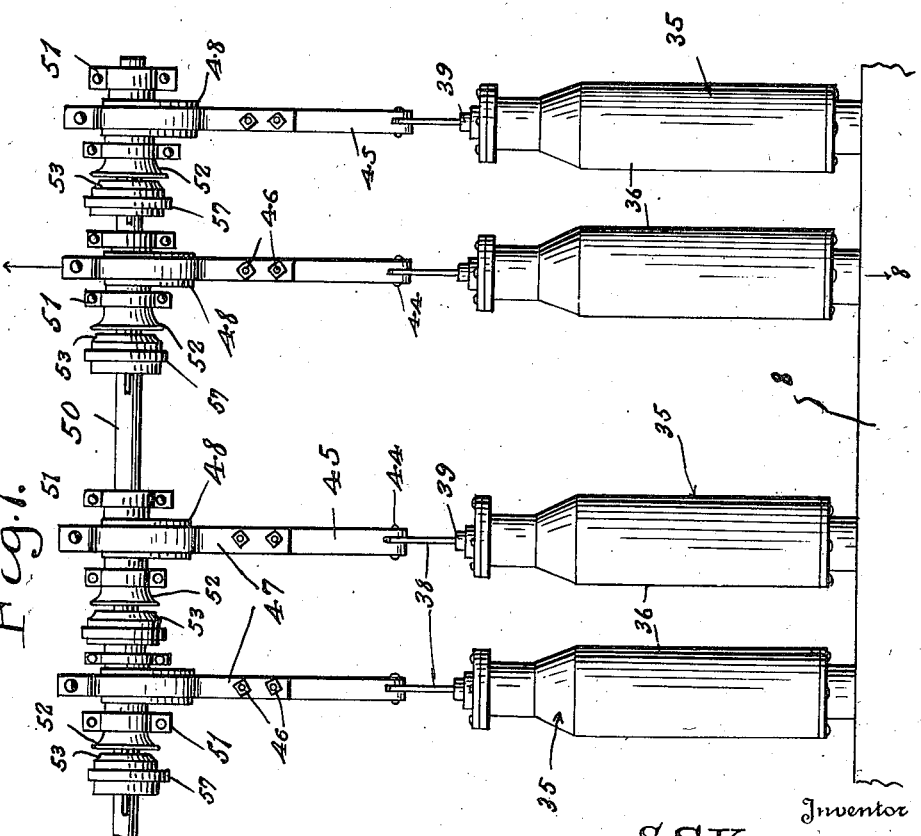
Inventor
S. S. Vernon.

UNITED STATES PATENT OFFICE.

SEWARD S. VERNON, OF PATERSON, NEW JERSEY.

COMPRESSED-AIR-POWER PLANT.

1,251,849.  Specification of Letters Patent.  Patented Jan. 1, 1918.

Application filed May 5, 1917. Serial No. 166,681.

*To all whom it may concern:*

Be it known that I, SEWARD S. VERNON, a citizen of the United States, residing at Paterson, in the county of Passaic and State of New Jersey, have invented certain new and useful Improvements in Compressed-Air-Power Plants; and I do hereby declare the following to be a full, clear, and exact description of the invention, such as will enable others skilled in the art to which it appertains to make and use the same.

This invention relates to compressed air power plants and the primary object of the invention is to provide a power plant including an engine having a plurality of reciprocatory pistons which are operated by the forcing of compressed air within the cylinders which surround the pistons, which air is forced from a motive fluid chamber or reservoir into the top of the cylinder, upon the commencement of the down stroke of the pistons and further to provide means whereby the air that has been utilized by the engine will be exhausted out of the cylinders upon the up stroke of the pistons.

Another object of this invention is to provide a novel inlet valve controlling mechanism which is adjusted by the vertical movement of a conical member which engages and regulates the positions of valve stem striking members and the quantity of air admitted to each of the cylinders may be regulated as desired by the adjustment of the conical member.

A further object of this invention is to provide a plurality of air compressors which are operatively connected to the motive fluid reservoir of the engine and supply the necessary compressed air thereto for operating the engine.

A still further object of this invention is to provide means operable under an excessive air pressure within the reservoir for automatically arresting the operation of the air compressors until the air pressure within the reservoir falls to normal at which time the operation of the compressors is again started.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a side elevation of the engine or motor showing the connection with the means for automatically controlling the operation of the air compressor, and also showing the air compressors or pumps and the prime mover employed for operating them, diagrammatically.

Fig. 2 is an enlarged view of the engine or motor showing the parts thereof in section, Fig. 3 is a section on the line 3—3 of Fig. 2, Fig. 4 is an enlarged section illustrating the conical members for adjusting the inlet valve operating members, Fig. 5 is a horizontal section on the line 5—5 of Fig. 4, Fig. 6 is a section through the means for automatically controlling the operation of the air compressor and showing its connection to the air compressor operating shaft and members, Fig. 7 is a plan view of a series of air compressors, Fig. 8 is a section on the line 8—8 of Fig. 7, Fig. 9 is an enlarged section through one end of an air compressor cylinder, and Fig. 10 is a section on the line 10—10 of Fig. 2.

Referring more particularly to the drawings, 1 designates the crank casing of the motor or engine upon which a plurality of cylinders 2 are mounted and through which extends the crank shaft 3 of the motor. The usual type of fly wheel 4 is mounted upon one end of the crank shaft 3 and the shaft is provided with a plurality of crank portions 5 each of which is disposed at a quarter circle or an angle of ninety degrees with respect to the one next thereto. The cranks 5 have the piston rods 6 connected to the wrists thereof as is usual in motor construction. The piston rods 6 and the pistons 7 carried thereby reciprocate within the cylinders 2. The supporting structure of the motor has a motive fluid reservoir or chamber 8 attached thereto in any suitable manner such as by the angle bracket 9 as clearly shown in Fig. 2 of the drawings. The reservoir 8 may be formed integrally with the cylinders, if desired, without departing from the spirit of this invention. The reservoir 8 is provided for retaining the supply of compressed air which is employed for operating the engine. The reservoir 8 has a plurality of inlet openings 10 formed therein through which the air enters the cap from the air compressors, which will be hereinafter more fully described. The air egresses from the reservoir 8 through the pipes or tubes 11 which have communication with the interior of the cylinders 2 through the top of the cylinders so that the air entering the cylinders will strike the top of the pistons 7 and force the pistons downwardly.

The various pipes 11 have valves 12 positioned therein for controlling the passage of air from the reservoir 8 into the cylinders. The valves 12 have valve stems 13 connected thereto which valve stems are operated by members 14 for operating the valve.

The valve stem striking members 14 are slidably mounted in bores 15 which are formed in bosses 16. The bosses 16 are formed upon the upper end of a sleeve 17. Coil springs 18 are positioned within the bores 15 and have their innermost ends connected to the members 14 and their outer ends engaging the shoulder formed by the outer ends of the bores 15 for moving the members 14 inwardly. The inner ends of the members 14 engage the outer surface of a substantially frusto-conical adjusting member 20 which is mounted for vertical movement within the bore 20 and the adjustment of the substantially frusto-conical member 20 regulates the distance of the projection of the members 14 out of the bosses 16 and consequently regulate the stroke of the valve rods 13 and the distance of movement of the valve which in turn regulates the quantity of compressed air supplied to the interior of the cylinders 2.

The substantially frusto-conical member 20 has a vertical feed screw 21 attached to the upper surface thereof and projecting outwardly therefrom. The feed screw 21 extends upwardly through the feed nut 22 which has a beveled gear 23 attached thereto, the feed nut 22 being rotatably supported by a suitable collar 24 which is formed upon the top of the casing 25. The casing 25 incloses the valve stem operating members 14, as clearly shown in Fig. 2 and is attached in any suitable manner to a pair of the cylinders 2. The beveled gear 23 is rotated by a beveled gear 26 which is mounted upon a throttle rod 27. The throttle rod 27 extends outwardly beyond the motor or engine casing and is adapted to be manually operated for controlling the engine or motor.

The sleeve 17 has a beveled gear 28 mounted upon its lower end which rotates the sleeve for rotating the members 14 and moving them into engagement with the valve stem 13. The beveled gear 28 meshes with a second beveled gear 29 which is mounted upon a shaft 30. The shaft 30 is positioned within the crank casing 1 and rotatably supported by suitable bearings therein and it is operatively connected to the crank shaft through the medium of gears 31 and 32 which gears are arranged for properly timing the rotation of the shaft 30 and the operation of the valves.

The manually operated valves 33 are mounted in the pipe 11 so that in case the valves 12 fail to properly work, the supply of air to the cylinders may be cut off by the operation of the valves 33.

The compressed air necessary for the operation of the engine is supplied by air compressors 35, of the reciprocatory type which compressors include cylinders 36, in which are mounted reciprocatory pistons 37. The pistons 37 have piston rods 38 connected thereto which extend through stuffing boxes 39 carried at the inlet ends of the cylinders 36.

The outlet ends of the cylinders 36 have communication through a passageway 40 with the interior of the reservoir 8 or into any suitable receptacle as desired. The air is forced out of the cylinder 36 through the outlet opening 41 and is drawn into the cylinder behind the pistons upon the in or air compressing stroke of the piston through the air inlet 42. When the piston 47 starts upon its rearward stroke a spring controlled check valve 43, which is carried by the piston opens and allows the air to pass through the piston into the cylinder in front of the piston. The piston rod 38 is pivotally connected as shown at 34 to a pitman 45. The pitman 45 is connected, through the medium of bolts or the like 46 to an eccentric strap 47 which is mounted about an eccentric 48. The eccentric 48 is carried by a sleeve 49 which is rotatably mounted upon a shaft 50. The sleeve 49 is supported by suitable bearings 51 and it has a clutch section 52 carried by one end of the same which is adapted for coaction with a clutch section 53. The clutch section 53 is feathered or splined upon the shaft 50 so that when it is moved into engagement with the clutch section 52 the sleeve 49 and the eccentric 48 will be rotated by the rotation of the shaft 50, for controlling the operation of the air compressor. A mechanism identical with that heretofore described is applied for controlling the operation of all of the air compressors employed comprising the reservoir 8.

A structure is provided for automatically controlling the operation of the air compressor for arresting the air compressing operation of the members when the reservoir 8 becomes overcharged. This mechanism includes a cylinder 54 in which is mounted a reciprocable piston 55 to which a piston rod 56 is connected. The piston rod 56 has arms 57 connected thereto at spaced intervals which arms are pivotally supported as shown at 58 and are connected to the clutch members 53 so that when the rod 56 is moved outwardly the rods 57 will be rocked for moving the clutch sections 53 out of engagement with the clutch sections 52.

The cylinder 54 has communication, through a pipe 60 with the cap 8. A pressure valve 61 is interposed in the pipe 60 so that when the pressure within the reservoir 8 exceeds the maximum pressure desired therefor, it will operate the pressure valve 61, and allow air to pass through the pipe 60 and enter the cylinder 54 in front of the piston, 55, thereby forcing the piston toward the rear end of the cylinder and operating the piston rod 56 in the direction indicated by the arrow A in Fig. 6 of the drawings, which will rock the rods 57 and disengage the clutch sections, thereby arresting the operation of the air compressors which will allow the lowering of the air pressure within the reservoir 8 through the utilization of the compressed air charge therein. The air is bled from the cylinder 54, during the rearward movement of the piston 55 by a bleed valve 64 which bleed valve will diminish the air pressure within the cylinder 54 and allow the spring 65 to act for returning the piston 55 to its normal position. An upstanding arm 66 is pivotally connected as shown at 67 to the piston rod 56 and it has a coil spring 68 connected thereto. During the outward stroke of the piston 55, the arm 66 will move downwardly and pass beneath the enlargement 68 formed upon the end of the rod 69; after the arms have passed the enlargement, the spring 68' will move the arm 66 to a vertical position and it is held against downward pivotal movement outwardly away from the cylinder 54 by a boss 70 so that when it strikes the enlargement 68 upon the return stroke of the piston, it will rock the rod 69 which will in turn rock the rods 71 and 72 sufficiently for moving the valve members 73, over the opening 74 formed in the cylinder 54 which will allow the complete exhaust of the air from the cylinder 54 and also allow the piston 55 to assume its normal position at which time the clutch sections 53 will be moved into engagement with the clutch sections 52 and the operation of the air compressors will be again started for charging the reservoir 8 with compressed air.

A drain valve 75 is carried by the reservoir and when it is desired to drain all of the air from the reservoir, it may be accomplished through the medium of this valve.

The cylinders 2 have their exhaust ports 76 positioned in the cylinder heads or tops and these exhaust openings are closed by the valve members 77. The valve members 77 are shaped so that air pressure within the cylinder will seat the valve to prevent the exhaust of air from the cylinders during the downstroke of the pistons 7. The valves 77 are carried by rods 78 which extend upwardly through the top of the cylinders and have their upper ends connected to pivotally mounted rods 79. The rods 79 are pivotally supported by suitable supports 80 and have rods 81 connected thereto. The rods 81 have rollers 82 mounted upon their lower ends which ride over the periphery of cams 83. The cams 83 are mounted upon the shaft so that during the upstroke of the piston 7 the rods 81 will be forced upwardly, for depressing the enlarged end 84 of the pivoted rods 79 for unseating the valve 77 to allow the escape of the air from the cylinder. When the pressure upon the pivoted rods 79 is relieved, by the rotation of the cams 83, the springs 85 act to reseat the valve 77 and cut off the exhaust of air from the cylinder.

Summing up: generically the operation of the improved motor is as follows: The air is compressed and forced into the reservoir 8, by the operation of the air compressors 35, so that when the valves 12 are opened, the air entering the upper ends of the cylinders 2 will force the pistons 7 downwardly and consequently rotate the crank shaft 3 from which the power may be transmitted to any desired source. The operation of the various valves 12 of the motor or engine is controlled, through the rotation of the shaft 30 by the beveled gears 28 and 29 and the sleeve 17 so that the various pistons will be operated at different times for providing a power stroke always to the crank shaft 3 the cranks of which are disposed at angles at ninety degrees to each other so that no two of the pistons will be off centered at the same time. The quantity of air admitted to the cylinders 2 is controlled by the operation of the frusto-conical member 20 as previously described and the pressure of air within the reservoir 8 is controlled by the pressure valve 61, and the operation of the piston 55 eliminates any danger of the liability of breakage of the reservoir 8 under excessive pressure.

The improved power plant is primarily designed for the propulsion of motor vehicles, and by utilizing the compressed air engine in lieu of an ordinary gasolene or kerosene engine, a smooth even running engine is provided which eliminates the sudden jerks or movements occasioned by the starting and stopping of the gasolene engine; and a gasolene engine or any other suitable type of prime mover as indicated diagrammatically at 100 in Fig. 1 of the drawings may be provided for operating the shaft 15 and the air compressors or pumps 35.

From the foregoing description taken in connection with the accompanying drawings the advantages of construction and of the method of operation of the improved compressed air power plants will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What I claim is:

1. In a compressed air power plant, the combination, of a cylinder, a piston reciprocably mounted in the cylinder, a compressed air retaining reservoir supported above said cylinder, a pipe leading from the reservoir to the inlet of the cylinder, a valve positioned within said pipe for controlling the passage of air into said cylinder, a stem connected to said valve, a sleeve supported by said engine and rotatable by the reciprocatory movement of said pistons, and means carried by said sleeve for engagement with said valve stem for operating said valves.

2. In a compressed air power plant, the combination, of a cylinder, a piston reciprocably mounted in the cylinder, a compressed air retaining reservoir supported above said cylinder, a pipe leading from the reservoir to the inlet of the cylinder, a valve positioned within said pipe for controlling the passage of air into said cylinder, a stem connected to said valve, a sleeve carried by said engine and rotatable by the reciprocatory movement of said pistons, means carried by said sleeve for engagement with said valve stem for operating said valves, and means for adjusting the position of said valve stem engaging means for regulating the scope of movement of said valves for regulating the quantity of air admitted to said cylinders.

3. In a compressed air power plant, the combination, of a cylinder, a piston reciprocably mounted in the cylinder, a compressed air retaining reservoir supported above said cylinder, a pipe leading from the reservoir to the inlet of the cylinder, a valve positioned within said pipe for controlling the passage of air into said cylinder, a stem connected to said valve, a sleeve carried by said engine and rotatable by the reciprocatory movement of said pistons, means carried by said sleeve for engagement with said valve stem for operating said valves, means for adjusting the position of said valve stem engaging means for regulating the scope of movement of said valve for regulating the quantity of air admitted to said cylinders, an exhaust port formed in said cylinder, a valve normally closing said exhaust port, a valve stem projecting upwardly from said valve, a pivotally mounted arm carried by said cylinder for engagement with said valve stem for unseating said exhaust valve, and means operable upon reciprocatory movement of said piston for rocking said pivoted arm.

4. In a compressed air power plant, the combination, of a cylinder, a piston reciprocably mounted in the cylinder, a compressed air retaining reservoir supported above said cylinder, a pipe leading from the reservoir to the inlet of the cylinder, a valve positioned within said pipe for controlling the passage of air into said cylinder, a stem connected to said valve, a sleeve carried by said engine and rotatable by the reciprocatory movement of said pistons, means carried by said sleeve for engagement with said valve stem for operating said valve, means for adjusting the position of said valve stem engaging means for regulating the scope of movement of said valve for regulating the quantity of air admitted to said cylinders, an exhaust port formed in said cylinder, a valve normally closing said exhaust port, a valve stem projecting upwardly from said valve, a pivotally mounted arm carried by said cylinder for engagement with said valve stem for unseating said exhaust valve, means operable upon reciprocatory movement of said piston for rocking said pivoted arm, air compressors for charging said air reservoir, and means operable under the excessive air pressure when in said reservoir for automatically arresting operation of said air compressors.

5. In a compressed air power plant, the combination, of a cylinder, a piston reciprocably mounted in the cylinder, a compressed air retaining reservoir supported above said cylinder, a pipe leading from the reservoir to the inlet of the cylinder, a valve positioned within said pipe for controlling the passage of air into said cylinder, a stem connected to said valve, a sleeve carried by the engine and rotatable by the reciprocatory movement of said piston, means carried by said sleeve for engagement with said valve stem for operating said valve, means for adjusting the position of said valve stem engaging means for regulating the opening of said valve for regulating the quantity of air admitted to said cylinder, an exhaust port formed in said cylinder, a valve normally closing said exhaust port, a valve stem projecting upwardly from said valve, a pivotally mounted arm carried by said cylinder for engagement with said valve stem for unseating said exhaust valve, means operable upon reciprocatory movement of said piston for rocking said pivoted arm, air compressors for charging said air reservoir, means operable under the excessive air pressure in said reservoir for automatically arresting operation of said air compressors, and means automatically operated upon decreasing of excessive air pressure within said reservoir for restarting said air compressor.

6. In a compressed air power plant, the combination of a compressed air engine, an air reservoir supported by said engine, air supply pipes communicating with said reservoir and said engine, means operable by the operation of said engine for controlling the inlet of air into the engine through said pipe, air compressors communicating with said reservoir, and means for operating said compressors.

7. In a compressed air power plant, the combination of a compressed air engine, an air reservoir supported by said engine, air supply pipes communicating with said reservoir and said engine, means operable by the operation of said engine for controlling the inlet of air into the engine through said pipes, air compressors communicating with said reservoir, means for operating the compressors, and means operated by an excessive air pressure in said reservoir to arrest the operation of said compressors.

8. In a compressed air power plant, the combination of a compressed air engine, an air reservoir supported by said engine, air supply pipes communicating with said reservoir and said engine, means operable by the operation of said engine for controlling the inlet of air into the engine through said pipes, air compressors communicating with said reservoir, means for operating said compressors, means operated by an excessive pressure in said reservoir to arrest the operation of said compressors, and means automatically operated upon the decreasing of an excessive air pressure within said reservoir for restarting said compressors.

9. In a compressed air power plant, the combination of a compressed air engine, an air reservoir supported by said engine, air supply pipes communicating with said reservoir and said engine, means operable by the operation of said engine for controlling the inlet of air into the engine through said pipes, air compressors communicating with said reservoir, means for operating said air compressors, means operated by an excessive air pressure in said reservoir to arrest the operation of said compressors, said last named means including a clutch, a cylinder having communication with said air reservoir, a pressure valve for controlling the entrance of air into said last named cylinder, a piston mounted within said cylinder and operable upon entrance of air into the cylinder to operate said clutch for arresting operation of said compressors.

10. In a compressed air power plant, the combination of a compressed air engine, an air reservoir supported by said engine, air supply pipes communicating with said reservoir and said engine, means for controlling the inlet of air into the engine through said pipes, air compressors communicating with said reservoir, means for operating said compressors, means operated by an excessive air pressure in the reservoir to arrest the operation of said compressors, said last named means including, a clutch, a cylinder having communication with said air reservoir, a pressure valve for controlling the entrance of air into said cylinder, a piston mounted within said cylinder and operable upon entrance of air into said cylinder to operate said clutch for arresting operation of said compressors, means for returning said piston to its normal position upon the arresting of air entrance into said cylinder for operating said clutch to permit of restarting the said compressors.

11. In a compressed air power plant, the combination of a compressed air engine, an air reservoir supported by said engine, air supply pipes communicating with said reservoir and said engine, means for controlling the inlet of air into the engine through said pipes, air compressors communicating with said reservoir, means for operating said compressors, means operated by an excessive air pressure in the reservoir to arrest the operation of said compressors, said last named means including a clutch, a cylinder having communication with said air reservoir, a pressure valve for controlling the entrance of air into said cylinder, a piston mounted within said cylinder and operable upon entrance of air into said cylinder to operate said clutch for arresting operation of said compressors, means for returning said piston to its normal position upon the arresting of air entrance into said cylinder for operating said clutch to permit of restarting the said compressors, and means releasable by the entrance of air into said cylinder for preventing accidental movement of said piston.

In testimony whereof I affix my signature in presence of two witnesses.

SEWARD S. VERNON.

Witnesses:
 MARCELLA M. SHEEHAN,
 ROE E. VERNON.